United States Patent [19]
Hickman et al.

[11] Patent Number: 5,583,550
[45] Date of Patent: Dec. 10, 1996

[54] INK DROP PLACEMENT FOR IMPROVED IMAGING

[75] Inventors: Mark S. Hickman, Escondido; Peter C. Morris, El Cajon; Alpha N. Doan, San Diego, all of Calif.

[73] Assignee: Hewlett-Packard Company, Palo Alto, Calif.

[21] Appl. No.: 158,178

[22] Filed: Nov. 24, 1993

Related U.S. Application Data

[63] Continuation of Ser. No. 583,785, Sep. 19, 1990, abandoned, which is a continuation-in-part of Ser. No. 414,831, Sep. 29, 1989, Pat. No. 4,967,203.

[51] Int. Cl.$^6$ .......................................................... B41J 2/15
[52] U.S. Cl. ................................................................. 347/41
[58] Field of Search ................................ 347/12, 13, 40, 347/41, 42; 358/296, 297, 298

[56] References Cited

U.S. PATENT DOCUMENTS

| | | | |
|---|---|---|---|
| 4,617,580 | 10/1986 | Miyakawa | 346/136 |
| 4,631,548 | 12/1986 | Milbrandt | 347/43 X |
| 4,748,453 | 5/1988 | Lin et al. | 346/1.1 |
| 4,943,813 | 7/1990 | Palmer et al. | 346/1.1 |
| 4,963,882 | 10/1990 | Hickman | 346/1.1 |
| 4,967,203 | 10/1990 | Doan et al. | 346/1.1 |

FOREIGN PATENT DOCUMENTS 89306275  6/1989  European Pat. Off. .

*Primary Examiner*—Benjamin R. Fuller
*Assistant Examiner*—David Yockey

[57] ABSTRACT

Ink-jet images are improved by printing groups of adjacent pixels with clusters of overlapping ink drops for resisting random ink drop coalescence that would lead to a mottled image.

6 Claims, 2 Drawing Sheets

INK DROP PLACEMENT FOR IMPROVED IMAGING

CROSS REFERENCE TO RELATED APPLICATION

This is a continuation of application Ser. No. 07/583,785 filed on Sep. 17, 1990, now abandoned, which was a continuation-in-part of Ser. No. 07/414,831 filed Sep. 29, 1989 and now issued as U.S. Pat. No. 4,967,203.

TECHNICAL FIELD

The present invention pertains to ink-jet printing methods for controlling ink drop placement to improve the appearance of the printed image.

BACKGROUND INFORMATION

Ink-jet printers include one or more pens for delivering drops of ink to a printing medium, such as paper. An ink-jet pen typically includes a nozzle plate that has formed in it a plurality of nozzles. The nozzles are in fluid communication with an ink reservoir.

Any of a number of mechanisms may be employed for expelling ink through the nozzles of the pen. For instance, one mechanism, known as thermal-type ink-jet printing, includes a thin-film resistor mounted adjacent to each nozzle. To expel a drop of ink from a nozzle, a current pulse is applied to the resistor for heating the resistor. The heated resistor vaporizes a portion of the ink near the nozzle. The rapid expansion of the ink vapor forces a drop of ink through the nozzle. This "firing" of drops is controlled by a microprocessor in response to external data that is provided to the printer and that represents part of the desired image to be printed.

The ink-jet printer includes mechanisms for moving the pen and for advancing the paper relative to the pen. Typically, the pen is scanned across the paper one or more times, the paper is advanced, and the pen is again scanned across the paper. The microprocessor-controlled firing of selected nozzles at selected times during scanning of the pen produces on the paper an arrangement of ink dots in a resolution high enough to represent an image or textual information.

A measure of the quality of an ink-jet printed image is the uniformity of the printed ink density across the surface of the image. Preferably, individual ink drops will penetrate the permeable printing medium and diffuse evenly through the medium, joining with adjacently printed drops to form a continuous image element of substantially uniform ink density.

Unevenness in ink density causes an undesirable mottled appearance in the printed image. Uneven ink density may result in instances where adjacently printed ink drops randomly coalesce prior to penetration of the drops into the printing medium. This coalescence problem frequently occurs when the printing medium has low permeability, such as is characteristic of the clear films that are used for overhead projection displays.

Various methods have been used in the past to control ink drop placement for producing uniform, high-density images. For example, U.S. Pat. No. 4,748,453, entitled "Spot Deposition for Liquid Ink Printing," discloses a method wherein drops of ink printed in one scan of the pen are placed on the medium in a pattern that is intended to prevent overlap of flowable ink drops, thereby eliminating coalescence. A subsequent scan of the pen (which scan is delayed until the previously deposited drops sufficiently dry) prints new drops that overlap the previously printed drops. While this technique may be somewhat effective, the pattern in which the drops are printed during one scan results in diagonally adjacent drops being in tangential or perimeter contact. It has been found that this perimeter contact between simultaneously printed individual drops will cause coalescence of at least some of the diagonally adjacent drops. This uneven or random coalescence of ink drops will produce the mottled image mentioned earlier.

Placing drops on the printing medium in a manner that avoids any contact between simultaneously printed drops will eliminate the problem of drop coalescence; however, the overall ink density of the image will be reduced because of the corresponding increase in the amount of printing medium area that is exposed between drops, or more scans of the printhead over the printing medium will be required to achieve adequate ink density.

SUMMARY OF THE INVENTION

In its basic aspects, the present invention provides a method for placing ink drops from an ink-jet printing device onto a medium having a surface defined with a matrix of pixels arranged as adjacent horizontal rows and vertical columns of pixels. The method includes the steps of: (1) during a first scan of a pen of the device across the medium, directing a series of first clusters of at least two ink drops in each of the first clusters into contact with a respective series of first pixel groups, each of the first pixel groups having at least two adjacent pixels in a first of the rows and a first of the columns, the drops of each of the first clusters are directed to overlap, with one of the drops substantially covering one of the adjacent pixels each in each of the first pixel groups, upon contacting each of the first pixel groups respectively, and directing a series of second clusters of at least two ink drops in each of the second clusters into contact with a respective series of second pixel groups, each of the second pixel groups having at least two adjacent pixels in a second of the rows and a second of the columns, the drops of each of the second clusters are directed to overlap, with one of the drops substantially covering one of the adjacent pixels each in each of the second pixel groups, upon contacting each of the second pixel groups respectively, wherein the first clusters and the second clusters are directed so that pixel groups horizontally and vertically adjacent to the first pixel groups and the second pixel groups are substantially uncovered by the first clusters and second clusters; and (2) during at least one subsequent pass of the pen across the medium, directing subsequent clusters having at least two ink drops in each of the subsequent clusters into contact with the pixel groups that are horizontally and vertically adjacent to each of the first pixel groups and each of the second pixel groups.

The present invention is directed to an ink drop placement method for applying ink to a printing medium to produce a high-density image without mottling. The placement method involves controlling a conventional ink-jet pen so that drops of ink are fired in clusters of two or more for covering selected portions or "pixels" of the printing medium. As the clusters are printed during a scan of the pen, pixels that are horizontally and vertically adjacent to each printed cluster remain blank. Contact between clusters that are printed during one pen scan is limited to tangential or perimeter contact between two drops of diagonally adjacent printed clusters.

The drops that comprise each cluster overlap in the center of the cluster. This intentional overlapping of drops within the central region of the printed clusters results in a concentration of forces due to surface tension at the center of the cluster. Accordingly, during the period immediately following the instant a cluster is printed, the cluster-drops tend to coalesce toward the center of the printed cluster. This internal or central coalescence within each printed cluster resists coalescence force that may arise as a result of tangential contact between diagonally adjacent printed clusters.

The coalescence that occurs within the printed clusters (which coalescence is attributable to the overlapped arrangement of the ink drops in each cluster) does not produce observable mottling because this coalescence is present in all printed clusters, thereby producing a substantially uniform appearance across the entire printed image. Moreover, the amount of the areal overlap of drops within a printed cluster is established to be greater than the amount of areal contact that occurs between tangentially adjacent clusters. Consequently, the central coalescence force within each printed cluster (that force being a function of the surface tension of the ink and the area of overlap of the cluster drops) is greater than the coalescence force developed between tangentially contacting clusters. As a result, random coalescence between tangentially contacting clusters is substantially eliminated.

The method for placing drops in accordance with the present invention may be employed for printing or covering 50% of a printing medium region with one scan of the pen. If desired, 100% coverage may be obtained by applying the same 50% coverage pattern (albeit offset by one cluster in both the horizontal and vertical directions) during a second scan of the pen.

The arrangement of clusters for producing the 50% coverage pattern mentioned above is such that when a 50% pattern is converted into a 100% pattern during the second scan of the pen, substantially no printing medium is exposed.

As another aspect of this invention, a method for placing drop clusters to produce a 25% coverage pattern is disclosed. The 25% coverage pattern is particularly useful in instances where the ink drop size cannot be controlled to prevent excessive cluster to cluster overlap (hence, coalescence) with the 50% coverage pattern mentioned above.

DETAILED DESCRIPTION

Figure 1:
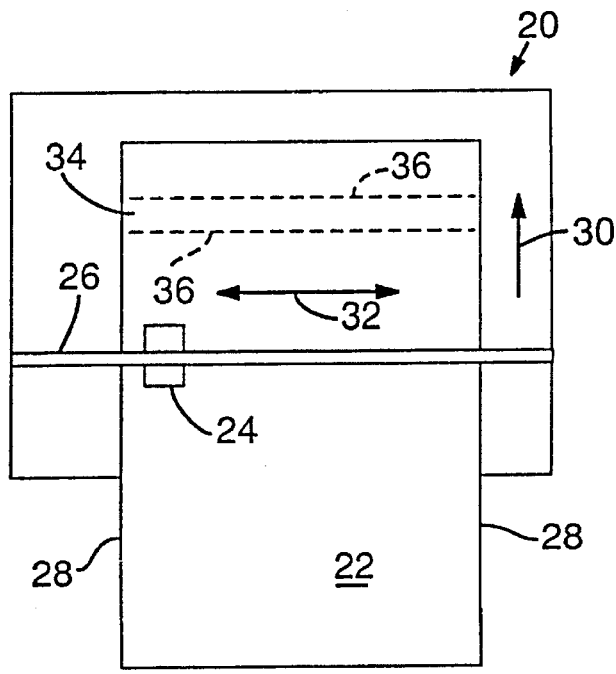
FIG. 1 is a diagram of an ink-jet printer that is suitable for carrying out the ink drop placement method of the present invention.

The diagram of FIG. 1 illustrates an ink-jet printer 20 having known mechanisms for securing and advancing relative to the printer a printing medium, such as a sheet of film 22 used with an overhead projector.

The film 22 is advanced relative to, and in close proximity with, an ink-jet pen 24. The pen 24 is mounted to a slide mechanism 26. As is known in the art, the pen 24 is reciprocally driven along the slide mechanism 26 between the side edges 28 of the film 22. The film 22 is advanced in a direction 30 that is perpendicular to the direction 32 in which the pen 24 is reciprocated. The movement of the pen 24 from one edge 28 to another is hereafter referred to as a scan. All ink drops printed by the pen 24 during a single scan will be referred to as being simultaneously printed.

The pen 24 includes a conventional nozzle plate (not shown) that has formed in it a plurality of nozzles through which drops of ink are expelled by mechanisms such as the thermal-type system described above. As the pen 24 is scanned across the film 22, it "covers" a single swath 34. A single swath 34 is illustrated in FIG. 1 as the space between the dashed reference lines 36 that extend between the film edges 28. By "covered" is meant that the pen 24 may be controlled during the scan for firing ink drops through the nozzles to cover any selected area within the swath 34. A new swath is defined as the film 22 is advanced. Each new swath is immediately adjacent to the prior swath to ensure printing continuity from the top to the bottom of the film 22.

Figure 2:
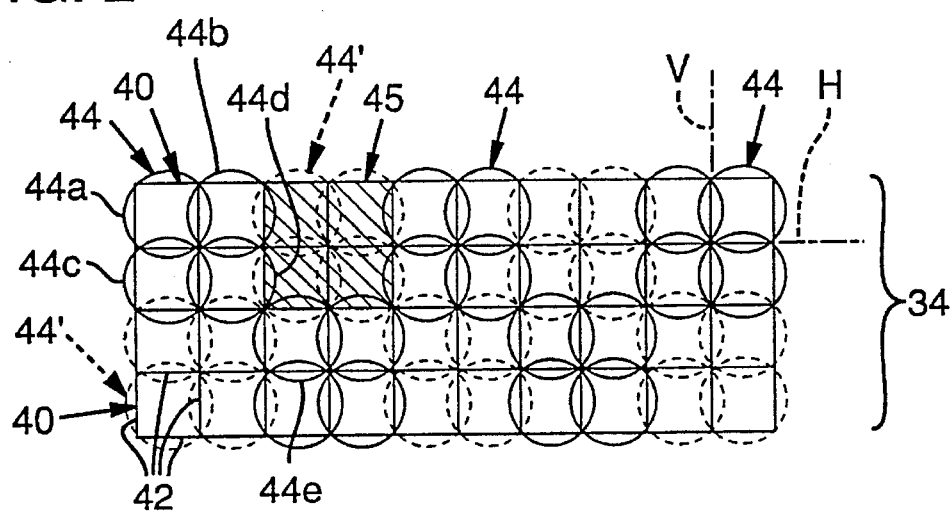
FIG. 2 is a diagram showing a medium printed with a preferred arrangement of four-drop clusters covering 50% of the printing medium surface.

It is convenient to consider each swath 34, hence, the entire film surface, as being defined as a continuous matrix of discrete elements, or pixels. As shown in FIG. 2, the pixels 40 may be considered as four-sided surface elements arranged in horizontal (that is, left to right in FIG. 2) rows and vertical (top to bottom in FIG. 2) columns. Reference lines 42 are shown for the purpose of illustrating the boundaries that define individual pixels 40.

As mentioned earlier, the printer 20 is controlled for advancing the film 22, and the pen 24 is scanned across the swath 34 as selected pen nozzles are fired so that ink drops may be placed at selected pixels 40 within the swath 34. In accordance with the present invention, the printer 20 is controlled to place over selected pixels 40 ink drops that are arranged so that there results a substantially uniform-density image with substantially no random coalescence of ink.

In accordance with a preferred ink placement method of the present invention, the ink-jet pen 24 is fired in a manner such that a cluster 44 of four ink drops 44a, 44b, 44c, 44d is delivered to the printing medium 22 to cover four pixels. In the figures, printed ink drops are represented by circular solid lines that define the outer boundary of the printed drops. Accordingly, overlapping circular lines represent overlapping ink drops.

The cluster 44 is formed by timing the pen firing so that the four ink drops 44a–d overlap symmetrically across the common boundaries 42 of the four pixels 40 that are covered by the cluster 44. In this regard, the vertical common boundary of one group of drop-covered pixels 40 is indicated by line V in FIG. 2. The horizontal common boundary of a group of drop-covered pixels 40 is indicated by line H. For convenience, any four adjacent pixels that are covered (or may be covered by) a single drop cluster 44 will be referred to as a pixel group 45. One such uncovered group 45 is depicted, for illustration purposes with cross-hatched lines in FIG. 2.

Each drop 44a–d of a cluster 44 is sized to completely cover the area within boundary lines 42 of a pixel 40. As shown in FIG. 2, the drops 44a–d also extend slightly beyond these surface area boundaries 42 in the horizontal and vertical directions. This extension permits pixel to pixel overlap where complete ink coverage of the swath 34 is desired, as described more fully below. Best results are achieved where the diagonally adjacent drop pairs 44a, 44d and 44b, 44c of a four-drop cluster 44 are directed to land immediately adjacent to one another without overlapping.

FIG. 2 illustrates a 50% coverage pattern. A 50% coverage pattern means that 50% of the surface area in a particular region of the printing medium is covered with ink, and the remaining 50% is not covered with ink. Accordingly, with single color (e.g., black) printers, a 50% coverage pattern is useful for producing a shade of grey.

The preferred 50% coverage pattern for printing the pixels 40 in the swath 34 (FIG. 2) is such that every other pixel group 45 in a row of pixel groups, and every other group 45 in a column of pixel groups 45, is printed with a drop cluster 44. Put another way, pixels 40 that are horizontally and vertically adjacent to printed clusters are substantially uncovered by the drop clusters 44.

The printed drop clusters 44 are arranged to be in tangential contact (that is, contact between ink drop edges with substantially no overlap) with other clusters 44 that are diagonally adjacent. This tangential contact between diagonally adjacent clusters ensures complete pixel coverage in regions that are to be printed with a 100% coverage pattern, as described more fully below.

The above-noted central overlapping of ink drops near the center of the drop clusters 44 produces a temporarily uneven distribution of surface tension forces across the cluster 44. In particular, the surface tension forces across the cluster 44 (which tension is the primary force causing coalescence of the cluster) is relatively high at the overlapped central region of the cluster. Accordingly, during the period immediately following the instant the cluster 44 contacts the printing medium 22, the drops 44a–d of the cluster tend to coalesce generally toward the center of the printed pixel-group 45. Consequently, this central or internal coalescence of the individual cluster 44 resists the relatively lower coalescence forces that develop between the tangentially contacting drops, such as occurs at the contact point between drops 44d and 44e (FIG. 2) in diagonally adjacent clusters 44.

As noted earlier, the coalescence that occurs within the printed clusters 44 does not produce observable mottling because this coalescence is present in all printed clusters 44, thereby producing substantially uniform ink density across the entire printed image. Moreover, the amount of the areal overlap of the drops 44a–d of a cluster is established to be greater than the amount of areal contact that occurs between tangentially adjacent clusters. Consequently, the central coalescence force within each printed cluster 44 (that force being a function of the surface tension of the ink and the area of overlap of the drops 44a–d) will be greater than the coalescence force developed between tangentially contacting clusters, such as occurs at the contact point between drops 44d and 44e (FIG. 2). As a result, random coalescence between tangentially contacting clusters is substantially eliminated.

It can be appreciated that if a pixel 40 were covered, for example, with a single ink drop (i.e., without overlapping simultaneously printed adjacent drops), there would be less tendency, as compared to the overlapped drops of clusters 44, for the single drop to resist coalescence with another tangentially contacting single drop. More particularly, there would be no surface tension gradient (i.e., relatively higher surface tension forces away from the edges of the drop) for resisting coalescence of two tangentially contacting drops. Accordingly, coalescence of simultaneously printed adjacent single-drop pixels would occur randomly, along with the attendant mottled appearance of the printed image.

The ink drop volumes and percentage of ink drop area overlap for each of the individual drops 44a–d of the cluster 44 are selected to ensure that the central coalescence of the cluster 44 is great enough to resist coalescence with diagonally adjacent clusters. In this regard, acceptable results for printing on conventional overhead projection type film are achieved where the surface area of each drop 44a–d within the cluster 44 overlaps about 20% of a horizontally adjacent drop and about 20% of a vertically adjacent drop.

As the printed drop cluster 44 penetrates the film 22, the volume of ink within the cluster 44 flows outwardly and becomes substantially uniformly distributed across the area of the printed pixel group 45. The internal capillarity of the film 22 thereafter prevents any significant pixel to pixel coalescence between simultaneously printed pixels.

As noted earlier, FIG. 2 represents a 50% coverage pattern printed during a single scan of the pen 24. The printing medium region shown in FIG. 2 may be printed with a 100% coverage pattern (i.e., 100% of the pixels in the region being covered with ink). To this end, the printer 20 is controlled to scan the pen 24 across the swath 34 a second time so that the pen nozzles may be fired to direct drop clusters 44' to the pixel groups 45 that are horizontally and vertically adjacent to the pixel groups that were printed during the first scan described above.

FIG. 2 illustrates in dashed lines the placement of 4-drop clusters 44' printed during the second scan of the pen 24. The second-scan drop clusters 44' overlap the first-scan clusters 44 along the common boundaries of adjacent pixel groups 45. It has been found that a typical time interval (for example, 0.1 second) between the first and second scan is sufficient to permit the first-scan clusters 44 to partly penetrate the printing medium and to partly dry so that cluster to cluster coalescence (as would likely occur with two "wet" simultaneously printed and overlapping clusters) will not occur.

It can be appreciated that the 100% coverage pattern depicted in FIG. 2 includes no exposed printing medium. Accordingly, the overall ink density of the printing medium region is very high.

Figure 3:
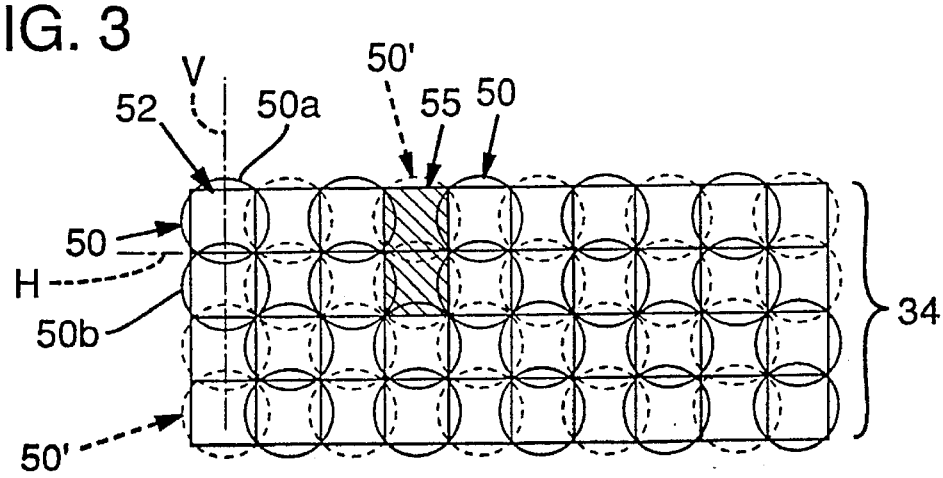
FIG. 3 is a diagram showing a medium printed with an arrangement of two-drop clusters covering 50% of the printing medium surface.

FIG. 3 depicts an alternative drop placement method wherein two-drop clusters 50 are substituted for the four-drop clusters 44 described above. The clusters 50 comprise two ink drops 50a, 50b that overlap across the horizontal centerline H of the printed pixel groups 55. The centers of the drops 50a, 50b are vertically aligned.

Each pixel group 55 depicted in FIG. 3 comprises two vertically adjacent pixels 52. The shape of the pixel groups 55 are, therefore, rectangular, with central long axes being in the vertical direction. One uncovered group 55 is depicted, for illustration purposes, with cross-hatched lines in FIG. 3.

The arrangement of the drop clusters 50 are formed by timing the pen firing so that the two ink drops 50a, 50b of the cluster 50 overlap as shown, and so that every other pixel group 55 in a row of pixel groups, and every other pixel group 55 in a column of pixel groups, is printed with a drop cluster 50. As before, the printed drop clusters 50 are arranged to be in tangential contact with other clusters 50 that are diagonally adjacent to them.

As was described above with respect to the four-drop cluster 44, each centrally overlapped two-drop cluster 50 has, immediately after printing, a surface tension force gradient that results in internal or central coalescence of ink within the printed pixel group 55. This internal coalescence resists random coalescence between diagonally adjacent simultaneously printed clusters 50.

If desired, a second scan of two-drop clusters (dashed lines 50' in FIG. 3) may be printed over the pixel groups 55 that were left uncovered after the first scan. The second scan, therefore, converts the 50% coverage pattern into a 100% coverage pattern.

Figure 4:
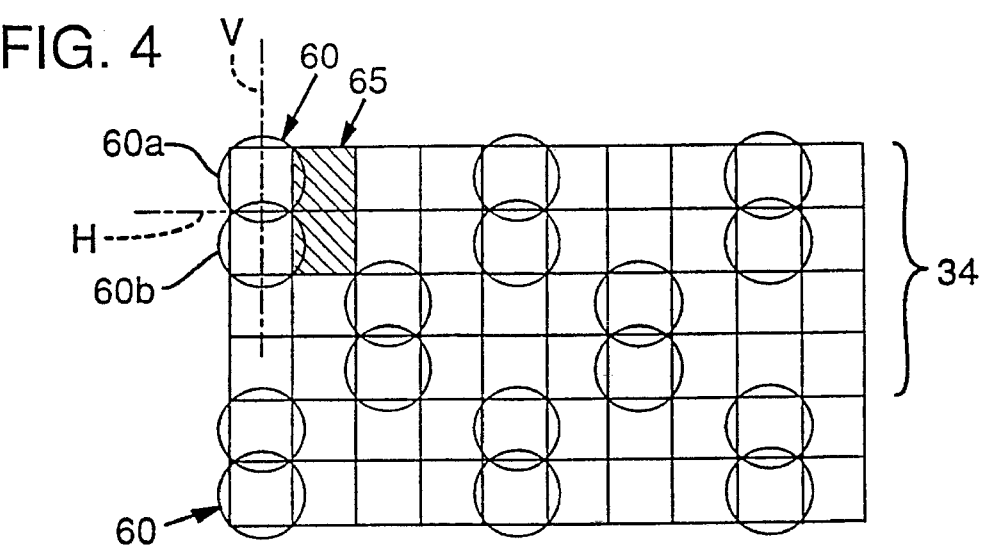
FIG. 4 is a diagram showing a medium printed with an arrangement of two-drop clusters covering 25% of the printing medium surface.

FIG. 4 depicts a 25% coverage pattern printed with two-drop clusters 60. Each two-drop cluster 60 comprises two ink drops 60a, 60b arranged to overlap about the horizontal centerline H of the pixel group 65. The centers of drops 60a, 60b are vertically aligned. The 25% pattern is printed so that every fourth pixel group 65 in a row of pixel groups, and every other pixel group 65 in a column of pixel groups, is printed with a two-drop cluster 60.

Figure 5:
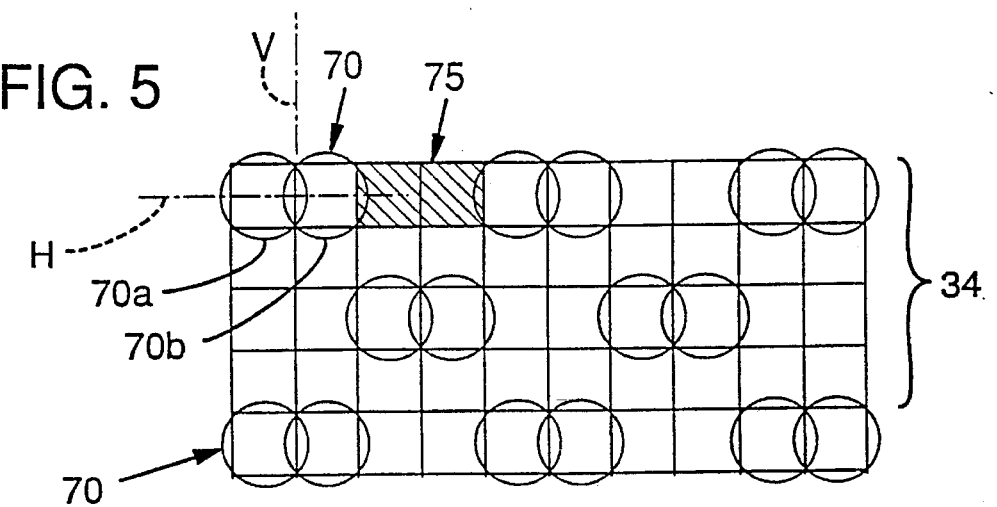
FIG. 5 is a diagram showing a medium printed with another arrangement of two-drop clusters covering 25% of the printing medium surface.

FIG. 5 depicts an alternative arrangement of a two-drop cluster 70 for printing a 25% coverage pattern. In FIG. 5, the two-drop cluster 70 is arranged so that the drops 70a, 70b overlap about the vertical centerline V of the pixel group 75. The centers of the drops 70a, 70b are horizontally aligned. The pixel groups 75 are oriented to correspond with the orientation of the drop cluster 70. Accordingly, the rectangular-shaped pixel groups 75, are oriented with long axes in the horizontal direction. The 25% pattern depicted in FIG. 5 is printed so that every other pixel group 75 in a row of pixel groups, and every fourth pixel group in a column of pixel groups is printed with a two-drop cluster 70.

Figure 6:
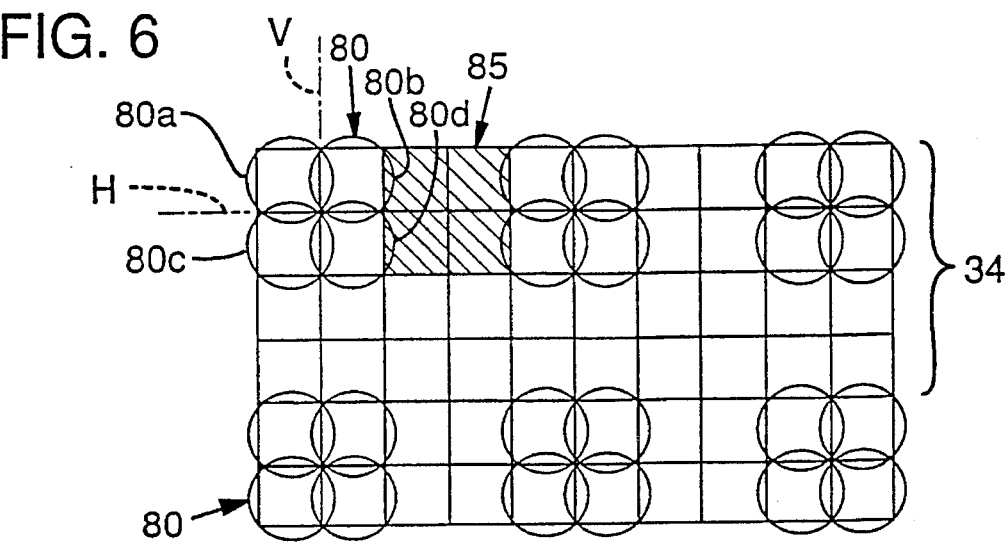
FIG. 6 is a diagram showing a medium printed with another arrangement of four-drop clusters covering 25% of the printing medium.

FIG. 6 depicts another alternative arrangement for printing a 25% coverage pattern, using four-drop clusters 80. The four-drop clusters 80 depicted in FIG. 6 are substantially identical to those clusters 44 described with respect to FIG. 2. Accordingly, the individual drops 80a, 80b, 80c, 80d overlap along the vertical V and horizontal H centerlines of the pixel groups 85. The 25% pattern depicted in FIG. 6 is printed so that every other pixel group 85 in a row of pixel groups 85, and every other pixel group in a column of pixel groups is simultaneously printed with the four-drop cluster 80.

It may be useful to employ the 25% coverage pattern described with respect to FIGS. 4–6 in instances where the size of the ink drops cannot be sufficiently controlled to produce 50% coverage patterns that have no significant overlap between diagonally adjacent pixel groups. The 25% coverage pattern (FIGS. 4–6) is advantageous in this regard because the minimum distance between any two simultaneously printed clusters 60, 70, 80 is increased compared to clusters 40 and 50 in the 50% coverage pattern (FIGS. 2–3). Accordingly, there is no tangential contact between simultaneously printed pixel groups 60, 70, 80, and the distance provided between the simultaneously printed pixel groups accommodates oversize ink drops that would otherwise overlap with diagonally adjacent printed clusters.

A 100% coverage pattern may be produced from the 25% patterns of FIGS. 4–6 by repeating three times the pen scan across a single swath with the pen fired so that the uncovered pixel groups are covered with the drop clusters.

While the present invention has been described in accordance with preferred embodiments, it is to be understood that certain substitutions and alterations may be made thereto without departing from the scope of the appended claims.

We claim:

1. A method for placing ink drops onto a print medium from an ink-jet printing device, said ink-jet printing device having an ink-jet pen for scanning across and directing said ink drops onto the medium, said print medium having a surface defined as a matrix of pixels arranged as adjacent horizontal rows and vertical columns of pixels, the method comprising the steps of:

during a first scan of said pen across said medium,
      directing a series of first clusters of at least two ink drops in each of said first clusters into contact with a respective series of first pixel groups, each of said first pixel groups having at least two adjacent pixels in a first of said rows and a first of said columns, the drops of each of said first clusters are directed to overlap, such that one of said drops is substantially covering one of said adjacent pixels each in each of said first pixel groups, upon contacting each of said first pixel groups respectively, and
      directing a series of second clusters of at least two ink drops in each of said second clusters into contact with a respective series of second pixel groups, each of said second pixel groups having at least two adjacent pixels in a second of said rows and a second of said columns, the drops of each of said second clusters are directed to overlap, such that one of said drops of each of said second clusters is substantially covering one of said adjacent pixels each in each of said second pixel groups, upon contacting each of said second pixel groups respectively,
   wherein each of said first clusters and each of said second clusters are directed so that pixel groups horizontally and vertically adjacent to each of said first pixel groups and each of said second pixel groups are substantially uncovered by said first clusters and said second clusters; and
   during at least one subsequent scan across said medium,
   directing subsequent clusters having at least two ink drops in each of said subsequent clusters into contact with pixel groups that are horizontally and vertically adjacent to each of said first pixel groups and each of said second pixel groups.

2. The method of claim 1, further comprising:

in a single scan, directing each of said first clusters and each of said second clusters to be located diagonally adjacent to one another.

3. The method of claim 2, further comprising:

in a single scan, directing each of said first clusters and each of said second clusters to be in tangential contact with one another.

4. The method of claim 1, further comprising:

each of said first clusters are directed so that the ink drops of each of said first clusters overlap within each of said first pixel groups and wherein each of said second clusters is directed so that the ink drops of each of said second clusters overlap within each of said second pixel groups.

5. The method of claim 1, further comprising:

each of said first clusters and each of said second clusters each comprise four ink drops that are directed to overlap within the respective first pixel groups and the second pixel groups.

6. The method as set forth in claim 1, further comprising:

repeating said steps of said first scan and said subsequent scan sequentially for each of said pixel groups on said surface until all said pixels of said surface have been scanned.

* * * * *